(12) United States Patent
Stultz et al.

(10) Patent No.: US 9,280,031 B2
(45) Date of Patent: Mar. 8, 2016

(54) METHODS AND APPARATUS FOR IDLER EXTRACTION IN HIGH POWER OPTICAL PARAMETRIC AMPLIFIERS

(71) Applicant: RAYTHEON COMPANY, Waltham, MA (US)

(72) Inventors: Robert Stultz, Cypress, CA (US); Brian Boland, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/340,688

(22) Filed: Jul. 25, 2014

(65) Prior Publication Data

US 2016/0026066 A1     Jan. 28, 2016

(51) Int. Cl.
*G02F 1/35* (2006.01)
*G02F 1/39* (2006.01)
*G02F 1/355* (2006.01)

(52) U.S. Cl.
CPC ............... *G02F 1/39* (2013.01); *G02F 1/3501* (2013.01); *G02F 1/3553* (2013.01); *G02F 2001/3503* (2013.01); *G02F 2001/3507* (2013.01); *G02F 2001/392* (2013.01)

(58) Field of Classification Search
CPC ........................................................ G02F 1/39
See application file for complete search history.

(56) References Cited

U.S. PATENT DOCUMENTS

| 5,751,472 | A  | * | 5/1998  | Jeys et al. ..................... 359/330 |
| 6,147,793 | A  |   | 11/2000 | Alford et al. |
| 6,359,914 | B1 | * | 3/2002  | Powers et al. ................... 372/25 |
| 8,773,753 | B2 | * | 7/2014  | Kato et al. ................. 359/337.2 |
| 2011/0180729 | A1 |   | 7/2011  | Kafka et al. |

OTHER PUBLICATIONS

Haakestad, M. W. et al., "High-Pulse-Energy 8 mm Laser Source Based on Optical Parametric Amplification in ZnGeP2," Proc. of SPIE vol. 6998, 2008, 7 pages.
Zayhowski, J. J., et al., "Miniature Eye-Safe Laser System for High-Resolution Three-Dimensional Lidar," Applied Optics, vol. 26, No. 23, Aug. 10, 2007, 6 pages.

* cited by examiner

*Primary Examiner* — Hemang Sanghavi
(74) *Attorney, Agent, or Firm* — Lando & Anastasi, LLP (57) ABSTRACT

An optical parametric amplifier and methods for idler extraction therein. Certain examples provide a method of extracting the idler at intermediate points within the optical parametric amplifier chain to improve conversion efficiency and/or maintain high beam quality (high Strehl ratio), where the pump beam has non-uniform profile. In one example, optical parametric amplifier includes an amplifier chain having a plurality of gain stages, each gain stage including a non-linear optical crystal, the plurality of gain stages configured to receive a signal seed and a pump beam and to produce an idler and an amplified signal, the pump beam having a non-uniform spatial profile, and a plurality of idler extractors interspersed with the plurality of gain stages and configured to extract the idler from intermediate points within the amplifier chain. The idler extractors can include polarizers, beam displacer crystals, or dichroic mirrors, for example.

23 Claims, 7 Drawing Sheets

METHODS AND APPARATUS FOR IDLER EXTRACTION IN HIGH POWER OPTICAL PARAMETRIC AMPLIFIERS

BACKGROUND

An optical parametric amplifier (OPA) is an optical amplifier based on the nonlinear optical effect known as 3-wave mixing. In the 3-wave mixing interaction, an incident pump photon is annihilated and two lower-energy photons (signal and idler) are created in the presence of a nonlinear optical crystal. The vacuum wavelengths of the signal and idler photons are constrained such that conservation of energy is satisfied, i.e. the sum of the signal and idler photon energies is equal to the pump photon energy. In order to efficiently transfer energy from the pump to the signal and idler, the photons must meet a phase matching condition (momentum conservation). In one type of phase matching, called birefringent phase matching, the phase matching conditions can be influenced by adjusting the orientation of the nonlinear crystal with respect to the incident pump direction (angle tuning). In certain types of birefringent phase matching, called Type II phase matching, the idler polarization is orthogonal to both the pump and the signal polarizations. Other types of phase matching are also possible, such as quasi phase matching.

A typical OPA is implemented as follows. A strong pump beam of a first wavelength is mixed with a relatively weak signal (seed) beam having the desired output wavelength. The signal beam is amplified and an idler beam is created by depleting the pump beam, as discussed above. In this manner, the OPA produces a strong output signal beam at the same wavelength as the signal seed and simultaneously reduces the power of the pump beam. Thus, the OPA is considered to "convert" the pump beam into the desired signal.

The process described above will be referred to as forward-conversion, i.e. power flows from the pump beam to the signal and idler beams. Under certain conditions, a process called back-conversion can occur where power flows from the signal and idler beams back to the pump beam. Back-conversion reduces and limits the pump-to-signal conversion efficiency in an OPA system. In addition, the signal beam quality can be degraded due to phase distortions resulting from back-conversion.

Back-conversion can occur when a phase-mismatch develops between the three waves. When multiple OPA stages are employed, it is often desired to remove the idler beam between stages since it is difficult to keep all three waves properly phased when propagating from one stage to the next. Removing the idler beam guarantees power flow from the pump to the signal beam in the subsequent OPA stage, regardless of relative phase between the three waves. Back-conversion can also occur within an OPA crystal stage when the pump photons have been completely depleted. If signal and idler photons are still present, then power flows back to the pump beam. The latter back-conversion process can occur in one or more regions of the pump beam transverse profile, if it has a non-uniform spatial profile.

Conventional methods for idler extraction include the use of dichroic mirrors that transmit the signal and pump beams and reflect the idler beam. Dichroic mirror coatings with reflectance specifications at 3 wavelengths typically include a large number of dielectric film layers and can have a low laser damage threshold. This is problematic in high-peak-power or high-average-power OPA or optical parametric oscillator (OPO) systems. Other conventional methods include employing an optical medium between OPA stages that absorbs the idler power and transmits both the signal and pump waves. This approach is problematic in high-average-power OPA systems because the absorbed idler causes thermo-optical variations in the absorbing medium that can distort the phase of the pump and signal beams.

SUMMARY OF INVENTION

Aspects and embodiments are directed to configurations for an optical parametric amplifier and methods for idler extraction in such an optical parametric amplifier.

According to one embodiment, a multi-stage optical parametric amplifier comprises an amplifier chain including a plurality of gain stages. Each gain stage includes a non-linear optical crystal. The plurality of gain stages are configured to receive a signal seed and a pump beam and to produce an idler and an amplified signal. The pump beam has a non-uniform spatial profile. A plurality of idler extractors are interspersed with the plurality of gain stages and configured to extract the idler from intermediate points within the amplifier chain.

According to another embodiment, a multi-stage optical parametric amplifier comprises an amplifier chain including a plurality of gain stages, each gain stage including a non-linear optical crystal, the plurality of gain stages configured to receive a signal seed and a pump beam and to produce an idler beam and an amplified signal, the pump beam having a non-uniform spatial profile. The amplifier further comprises a plurality of idler extractors configured to substantially preclude the idler beam from further interaction with the amplified signal and the pump beam, the plurality of idler extractors being located prior to those points within the amplifier chain where at least a portion of the pump beam spatial profile would become depleted in the absence of each idler extractor.

The idler extractors may include dichroic mirrors, polarizers, or beam displacer crystals. Where the idler extractors are polarizers or beam displacer crystals, the phase-matching of the non-linear optical crystal in each gain stage may be birefringence phase matching of Type II or quasi-phase-matching of Type II. In certain examples, the signal seed, the amplified signal, and the pump beam share a first linear polarization state, and the idler has a second, orthogonal linear polarization state.

In one example, the plurality of idler extractors includes a plurality of beam displacer crystals interspersed with the plurality of gain stages and configured to produce a spatial separation of the idler from the amplified signal and the pump beam, wherein upon exit from each of the plurality of beam displacer crystals, the amplified signal and the pump beam are collinear and the idler is spatially offset from the amplified signal and the pump beam. The non-linear optical crystal may be rubidium titanyl arsenate (RTA), for example. The plurality of beam displacer crystals may be made of crystalline $TiO_2$ (rutile), $TeO_2$, or $YVO_4$, for example. In one example, the plurality of gain stages includes a first gain stage, a second gain stage, a third gain stage, and a fourth gain stage. In this example, the plurality of beam displacer crystals may include a first beam displacer crystal positioned between the second gain stage and the third gain stage, a second beam displacer crystal positioned between the third gain stage and the fourth gain stage, and a third beam displacer crystal positioned after the fourth gain stage. The optical parametric amplifier may further comprise an absorbing medium positioned between the first and second gain stages. In one example, the absorbing medium is BK7 glass. In one example, the first and second gain stages have longer length than the third and fourth gain stages. In another example, the plurality of beam displacer crystals are oriented such that the pump beam and amplified signal are ordinary waves and the idler is an extraordinary wave. The optical parametric amplifier may further comprise a first dichroic beamsplitter configured to combine and input the signal seed and the pump beam to the plurality of gain stages. The optical parametric amplifier may further comprise a second dichroic beamsplitter positioned after a last one of the plurality of beam displacer crystals in an optical path of the amplified signal and the pump beam, and configured to receive and spatially separate the amplified signal and the pump beam. In one example, the optical parametric amplifier further comprises a mirror positioned after the last one of the plurality of beam displacer crystals in an optical path of the idler and configured to direct the idler to an idler dumping/ extraction point of the optical parametric amplifier.

In one example, the non-uniform spatial profile of the pump beam is Gaussian. In another example, the non-uniform spatial profile of the pump beam is top-hat in one transverse axis and Gaussian in an orthogonal transverse axis.

In one example, a wavelength of the pump beam is 1030 nanometers, and a wavelength of the amplified signal is 1550 nanometers.

Another embodiment is directed to a method of idler extraction in an optical parametric amplifier. The method may comprise receiving a signal seed and a pump beam at an input to an amplifier chain, the amplifier chain including a plurality of gain stages, each gain stage including a non-linear optical crystal, and the pump beam having a non-uniform spatial profile, amplifying the signal seed with the plurality of gain stages to produce an idler and an amplified signal, and extracting the idler at a plurality of intermediate points within the amplifier chain.

In one example, extracting the idler is performed using dichroic mirrors positioned at the plurality of intermediate points within the amplifier chain. In another example, the signal seed, the amplified signal, and the pump beam share a first linear polarization state, and the idler has a second, orthogonal linear polarization state, and the idler extraction is performed using beam displacer crystals or polarizers.

In one example, the signal seed, the amplified signal, and the pump beam share a first linear polarization state, and the idler has a second, orthogonal linear polarization state, and extracting the idler includes spatially separating the idler from the amplified signal and the pump beam using a plurality of beam displacer crystals interspersed with the plurality of gain stages such that upon exit from each of the plurality of beam displacer crystals, the amplified signal and the pump beam are collinear and the idler is spatially offset from the amplified signal and the pump beam. In another example, the method further comprises combining and inputting the signal seed and the pump beam to the plurality of gain stages using a first dichroic beamsplitter. In another example, the method further comprises spatially separating the amplified signal and the pump beam using a second dichroic beamsplitter positioned after a last one of the plurality of beam displacer crystals in an optical path of the amplified signal and the pump beam.

According to one embodiment, a multi-stage optical parametric amplifier comprises a plurality of gain stages, with each gain stage including a non-linear crystal optical gain stage. The plurality of gain stages are configured to receive a signal seed and a pump beam and to produce an idler and an amplified signal. The pump beam has a non-uniform spatial profile. The signal seed, the amplified signal, and the pump beam share a first linear polarization state, and the idler has a second, orthogonal linear polarization state. A plurality of beam displacer crystals interspersed with the plurality of gain stages are configured to produce a spatial separation between the idler and the amplified signal and the pump beam, wherein upon exit from each of the plurality of beam displacer crystals, the amplified signal and the pump beam are collinear and the idler is spatially offset from the amplified signal and the pump beam.

In one example, a wavelength of the pump beam is 1030 nanometers, and a wavelength of the amplified signal is 1550 nanometers. In another example, the non-linear crystal optical gain stage is rubidium titanyl arsenate (RTA). In another example, the plurality of beam displacer crystals are made of crystalline $TiO_2$ (rutile). In another example, the plurality of beam displacer crystals are made of crystalline $TeO_2$ or $YVO_4$.

In one example, the plurality of gain stages includes a first gain stage, a second gain stage, a third gain stage, and a fourth gain stage, and the plurality of beam displacer crystals includes a first beam displacer crystal positioned between the second gain stage and the third gain stage, a second beam displacer crystal positioned between the third gain stage and the fourth gain stage, and a third beam displacer crystal positioned after the fourth gain stage. The optical parametric amplifier may further comprise an absorbing medium positioned between the first and second gain stages. In one example, the absorbing medium is BK7 glass. In another example, the first and second gain stages have longer length than the third and fourth gain stages.

The optical parametric amplifier may further comprise a first dichroic beamsplitter configured to combine and input the signal seed and the pump beam to the plurality of gain stages. In one example, the optical parametric amplifier further comprises a second dichroic beamsplitter positioned after a last one of the plurality of beam displacer crystals in an optical path of the amplified signal and the pump beam, and configured to receive and spatially separate the amplified signal and the pump beam. In another example, the optical parametric amplifier further comprises a mirror positioned after the last one of the plurality of beam displacer crystals in an optical path of the idler and configured to direct the idler to an idler extraction point of the optical parametric amplifier.

In one example, the non-uniform spatial profile of the pump beam is Gaussian. In another example, the non-uniform spatial profile of the pump beam is top-hat in one transverse axis, and Gaussian in the orthogonal transverse axis.

The plurality of beam displacer crystals may be oriented such that the pump beam and amplified signal are ordinary waves and the idler is an extraordinary wave.

According to another embodiment, a multi-stage optical parametric amplifier comprises an amplifier chain including a plurality of gain stages, and a plurality of idler extractors. Each gain stage includes a nonlinear optical crystal, and the plurality of gain stages are configured to receive a signal seed and a pump beam and to produce an idler beam and amplified signal. The plurality of idler extractors are interspersed with the plurality of gain stages and configured to spatially offset the idler beam from the amplified signal and the pump beam, and to maintain the idler beam substantially parallel to the pump beam and the amplified signal.

In one example, the signal seed, the amplified signal, and the pump beam share a first linear polarization state, and the idler beam has a second, orthogonal linear polarization state, and the plurality of idler extractors includes a plurality of beam displacer crystals. In this example, phase-matching of the non-linear optical crystal may be birefringence phase matching of Type II or quasi-phase-matching of Type II. In one example, the non-linear optical crystal is rubidium titanyl arsenate (RTA), and wherein the plurality of beam displacer crystals are made of crystalline $TiO_2$ (rutile), $TeO_2$, or $YVO_4$. The multi-stage optical parametric amplifier may further comprise a mirror positioned after the last one of the plurality of beam displacer crystals in an optical path of the idler beam, and configured to direct the idler beam to an idler dumping/extraction point of the optical parametric amplifier.

According to another embodiment, a method of idler extraction in an optical parametric amplifier comprises receiving a signal seed and a pump beam at an input to an amplifier chain, the amplifier chain including a plurality of gain stages, each gain stage including a non-linear optical crystal, and the pump beam having a non-uniform spatial profile, amplifying the signal seed with the plurality of gain stages to produce an idler beam and an amplified signal, and spatially offsetting the idler beam from the amplified signal and the pump beam at a plurality of intermediate points within the amplifier chain, such that the idler beam propagates through the amplifier chain substantially parallel to the pump beam and the amplified signal.

In one example of the method spatially offsetting the idler beam is performed using dichroic mirrors positioned at the plurality of intermediate points within the amplifier chain. In another example, the signal seed, the amplified signal, and the pump beam share a first linear polarization state, and the idler beam has a second, orthogonal linear polarization state, and offsetting the idler beam is performed using beam displacer crystals or polarizers. The method may further comprise directing the idler beam to an idler dumping/extraction point located after a last one of the intermediate points within the amplifier chain.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a methodology for improving the conversion efficiency of an optical parametric amplifier (OPA) and avoiding back-conversion when employing a pump beam with a non-uniform spatial profile. Some prior approaches to avoiding back-conversion in a non-uniform pump beam include adjusting the incident pump fluence or total OPA path length so that no part of the pump spatial profile is ever depleted so as to avoid the initial onset of back-conversion. However, this approach significantly limits the overall conversion efficiency because the lower intensity regions of the pump beam spatial profile are not converted as efficiently as the higher intensity regions. Aspects and embodiments provide a multi-stage OPA and method for extracting the idler beam between or following gain stages of the OPA using walk-off beam displacer crystals or dichroic mirrors, for example. In particular, according to certain embodiments, for Type II phase matching, a polarization splitter is used to separate the idler from the pump and signal wavelengths, thereby avoiding back-conversion in a subsequent OPA stage which would reduce the conversion efficiency and signal beam quality. In certain examples, rutile or a similar material is used for the polarization splitter, because as the idler passes through the rutile, its transverse beam profile is displaced relative to the other two beam profiles. When the idler profile is displaced such that a negligible amount of its energy spatially overlaps with the other two beams, the displaced idler no longer interacts with the other two beams in subsequent OPA stages. This approach allows the idler to be propagated along the entire multi-stage OPA system (outside of the signal/pump interaction region) and enables single-point idler extraction architectures. Furthermore, an optimization procedure may be implemented that recognizes that the greatest efficiency may be achieved in multi-crystal configurations by systematically reducing crystal length as the beams propagate through the crystal chain. As discussed in more detail below, according to certain embodiments, the various lengths of the OPA stages are adjusted to eliminate back-conversion across the beam profile and reset the local rates of conversion. By resetting the local rates of conversion following each OPA stage, the pump beam can be efficiently converted across the entire beam aperture without degrading signal beam quality.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
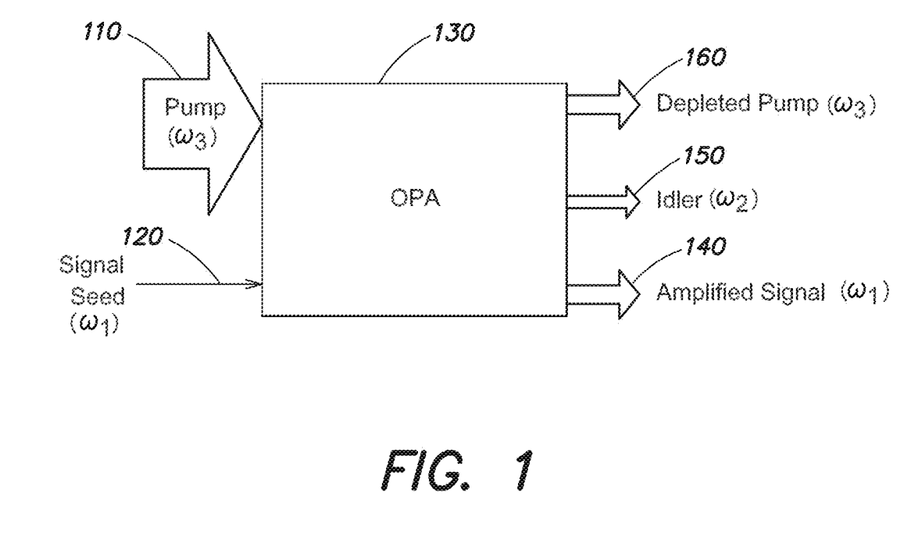
FIG. 1 is a block diagram of one example of an optical parametric amplifier according to aspects of the invention.

According to one embodiment, in an OPA a pulsed high-power pump beam having a first wavelength is mixed with a low-power continuous-wave (CW) signal seed having a second wavelength, using a gain stage. This concept is illustrated in block diagram form in FIG. 1. The pulsed pump beam 110 and CW signal seed 120 are input to the OPA 130. In one example, the mixing in the OPA 130 is achieved using a non-critically-phased-matched (NCPM) non-linear crystal for the gain stage. In particular, in one example, the crystal material is rubidium titanyl arsenate (RbTiOAsO$_4$, RTA); however, in other examples other materials may be used, for example, potassium titanyl arsenate (KTiOAsO$_4$, KTA) or potassium titanyl phosphate (KTiOPO$_4$, KTP). The pump beam 110 has a non-uniform spatial profile. In particular, in some examples, the pump beam 110 has a Gaussian or a top-hat by Gaussian spatial profile. The signal seed 120 is amplified (producing at the output an amplified signal 140) and an idler 150 is created, by depleting the pump beam 110 (producing at the output a depleted pump 160). The principle of photon energy conservation specifies that:

$$\omega_3 = \omega_1 + \omega_2 \quad (1)$$

where $\omega_1$ is the frequency of the signal seed 120, $\omega_2$ is the frequency of the idler 150, and $\omega_3$ is the frequency of the pump beam 110. Furthermore, according to the phase matching condition:

$$k_3 = k_1 + k_2 \quad (2)$$

where $k_1$ is the wave vector of the signal seed 120, $k_2$ is the wave vector of the idler 150, and $k_3$ is the wave vector of the pump beam 110.

In one example, the pump beam 110 has a wavelength of 1030 nanometers (nm), the signal seed 120 and amplified signal 140 have a wavelength of 1550 nm, and the idler 150 has a wavelength of 3075 nm. 1550 nm may be a desirable wavelength for the amplified signal 140 in some applications because it is "eye-safe," has good atmospheric transmission, and a standard telecommunications diode laser may be used to produce the signal seed 120. Accordingly, these values may be used for some of the examples discussed below; however, it will be appreciated by those skilled in the art, given the benefit of this disclosure, that the aspects and principles discussed herein may be applied to a wide variety of wavelengths, and the invention is not limited to any specific examples discussed herein. In one example, the 1030 nm pump beam 110 is produced using a Yb:YAG laser. As discussed above, the OPA 130 may include one or more non-linear crystals (e.g., RTA crystals) in a non-critical-phase-match (NCPM) orientation. RTA may be preferable in some examples, such as in applications using the above-mentioned or similar wavelengths, because RTA is optically transparent at all three wavelengths (pump, signal, and idler). Additionally, RTA allows co-linear propagation along the crystalline axis with no spatial walk-off in the OPA gain stage. However, as noted above, in other examples and applications other optical crystal materials may be used. In one example, the phase-matching of the non-linear crystals is birefringence phase matching of Type II where the idler polarization is orthogonal to the pump and signal polarizations. In another example, the phase-matching of the non-linear crystals is quasi-phase-matching of Type II where the idler polarization is orthogonal to the pump and signal polarizations.

Figure 2:
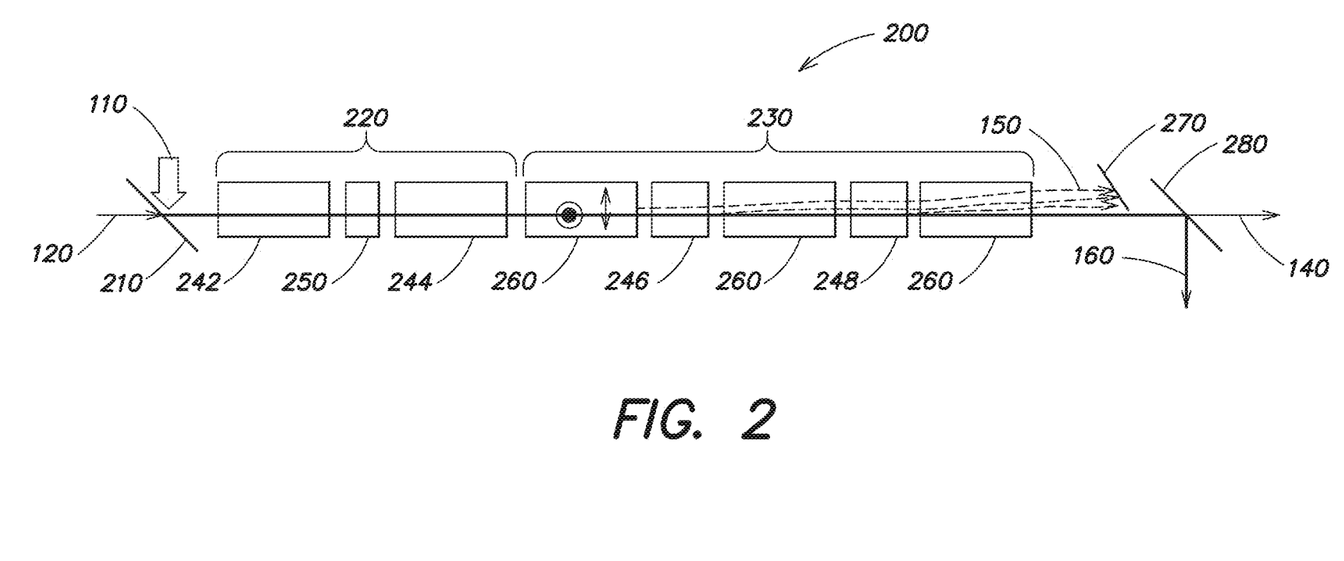
FIG. 2 is a block diagram of one example of a multi-stage optical parametric amplifier according to aspects of the invention.

Referring to FIG. 2, there is illustrated a block diagram of one example of a multi-stage OPA according to one embodiment. Multiple gain stages may be required, and are often used, in an OPA in order to achieve sufficient net parametric gain. One reason for multiple stages is that the OPA gain stage (nonlinear crystal) cannot be fabricated long enough to achieve the desired net parametric gain in one stage due to current state of manufacturing technology or to fundamental material limitations. Conventionally, multiple points of idler extraction are required for a multi-stage OPA. Conventional methods for extracting the idler which rely on the spectral dependence of materials in the gain stages include reflecting the idler 150 while transmitting both pump 110 and signal 140 (or vice versa), using a multilayer dielectric coating, or absorbing the idler 150 while transmitting both the pump 110 and signal 140. These methods produce multiple idler beam extraction points along the chain. In contrast, aspects and embodiments of the present invention provide alternate methods of idler extraction in a multi-stage OPA based on recognition of how the processes occurring in the multiple stages may be advantageously controlled to allow for fewer points, optionally only a single point, of idler extraction, while maintaining high efficiency and avoiding back-conversion in the OPA.

Referring to FIG. 2, the pump input 110 and signal seed 120 are input to the multi-stage OPA 200 via a dichroic beamsplitter 210. The multi-stage OPA includes a first section 220 and a second section 230, each of which may include one or more gain stages, as discussed further below. In one example, the pump beam 110 has a non-uniform spatial profile (e.g. Gaussian). In this case, the highest-intensity region of the pump beam 110 converts to signal and idler photons at a higher rate than in other regions of the pump beam. When the pump photons in this local region are depleted, the signal and idler photons (if both are present) will then start to back-convert to pump photons. As discussed above, this process results in a significant reduction in signal beam quality and conversion efficiency. Accordingly, removing the idler wave 150 after the pump photons have been depleted in one transverse region prevents back-conversion in this localized region in subsequent OPA gain stages. In other non-depleted regions of the pump beam 110, the interaction of the pump and signal waves causes an increase in signal wave intensity (gain), and corresponding decrease in pump intensity, while the idler wave 150 is created from the interaction. After the pump is depleted from these regions, the idler extraction process may be repeated.

According to one embodiment, it may be preferable to design the longest OPA stage path length(s) possible in the earliest stages of the OPA (e.g., in the first region 220) where both the signal 140 and idler waves 150 are building up from low levels and no spatial regions of the pump beam 110 have yet been depleted. The later stages of the OPA system (e.g., in the second section 230) may be designed with shorter path lengths in order to avoid back-conversion in depleted spatial regions of the pump beam 110. In the example illustrated in FIG. 2, the first section 220 of the multi-stage OPA 200 includes two gain stages 242 and 244, and the second section 230 includes two gain stages 246 and 248. In one example, in which the OPA 200 is configured with a 1030 nm pump beam 110 and a 1550 signal seed 120, the two gain stages 242 and 244 of the first section 220 each have a length of 20 mm, and the two gain stages 246 and 248 of the second section 230 each have a length of 10 mm. In one example, the material of the gain stages 242, 244, 246, and 248 is RTA. The lengths of the gain stages 242 and 244 of the first section 220 may be limited by manufacturing capabilities and/or material properties, thus requiring the first section 220 to include two or more gain stages, as discussed above. However, in other examples, the first section 220 may include a single gain stage.

As mentioned above, given a chain of parametric amplification processes, it is desirable to prevent idler photons generated in an earlier portion of the chain from participating in the parametric process at later portions of the chain. Accordingly, in one example, the two gain stages 242 and 244 of the first section 220 are separated by an absorbing medium 250. The gain stage 242 produces a small amount of idler 150 which may be extracted using the absorbing medium 250. In one example, the absorbing medium is BK7 glass, and may have a thickness of approximately 5 mm.

According to one embodiment, a method for idler extraction uses the anisotropy of an optical crystal to prevent the idler beam 150 from further participating in the parametric process. Embodiments of this method apply to parametric processes which use type II phase matching, where the signal 120/140 and pump 110 share the same linear polarization state, and the idler 150 is in the orthogonal linear polarization state. To remove the idler 150 from the parametric process, all three beams are propagated through an anisotropic optical crystal 260 (also referred to as a beam displacer crystal 260), oriented such that the idler 150 is an extraordinary wave, while the pump 110 and signal 120/140 are ordinary waves. In the example illustrated in FIG. 2, a beam displacer crystal 260 is positioned in between and following the gain stages 244, 246, 248. The extraordinary idler wave 150 undergoes Poynting vector walk off, and the crystal 260 is chosen such that its length and birefringence have spatially separated the idler beam profile from the pump and signal beam profiles when they exit the crystal. All three beams are still parallel after exiting the crystal, but the idler 150 no longer spatially overlaps the pump 110 and signal 120/140, as illustrated in FIG. 2. Therefore, the idler 150 will not participate in the parametric process at later points in the chain. This method has the advantage that the spatially separated idler beams produced at multiple points in the chain remain parallel to the signal and pump, and can be picked off at single point after leaving the chain of parametric amplification devices.

In one example, the beam displacer crystals 260 are made of crystalline TiO$_2$ (rutile). In other examples, the beam displacer crystals 260 may be made of crystalline TeO$_2$ or YVO$_4$. Rutile may be a preferred material for the beam displacer crystals 260 because it exhibits large birefringence and walk-off, has a high index of refraction, and supports high-power applications. Additionally, rutile is transparent at all wavelengths mentioned above (e.g., 1030 nm pump, 1550 nm signal, and 3075 nm idler), and is more stable chemically and physically compared to YVO$_4$. For a 3075 nm idler, rutile has a walk-off angle of about 5°, assuming that the c-axis of the crystal is oriented at 45° with respect to the direction of propagation. Accordingly, a 20 mm rutile crystal provides approximately a 2 mm spatial offset between the idler 150 and the collinear pump and signal beams. After the last beam displacer crystal in the chain, the idler 150 may be removed spatially from the OPA system 200 using a scraper mirror 270. As discussed above, embodiments of this method of idler extraction are advantageous in that they allow for a single-point extraction of the idler in a multi-stage OPA system. A dichroic beamsplitter 280 is used to separate the depleted pump 160 from the amplified output signal 140.

Figure 3:
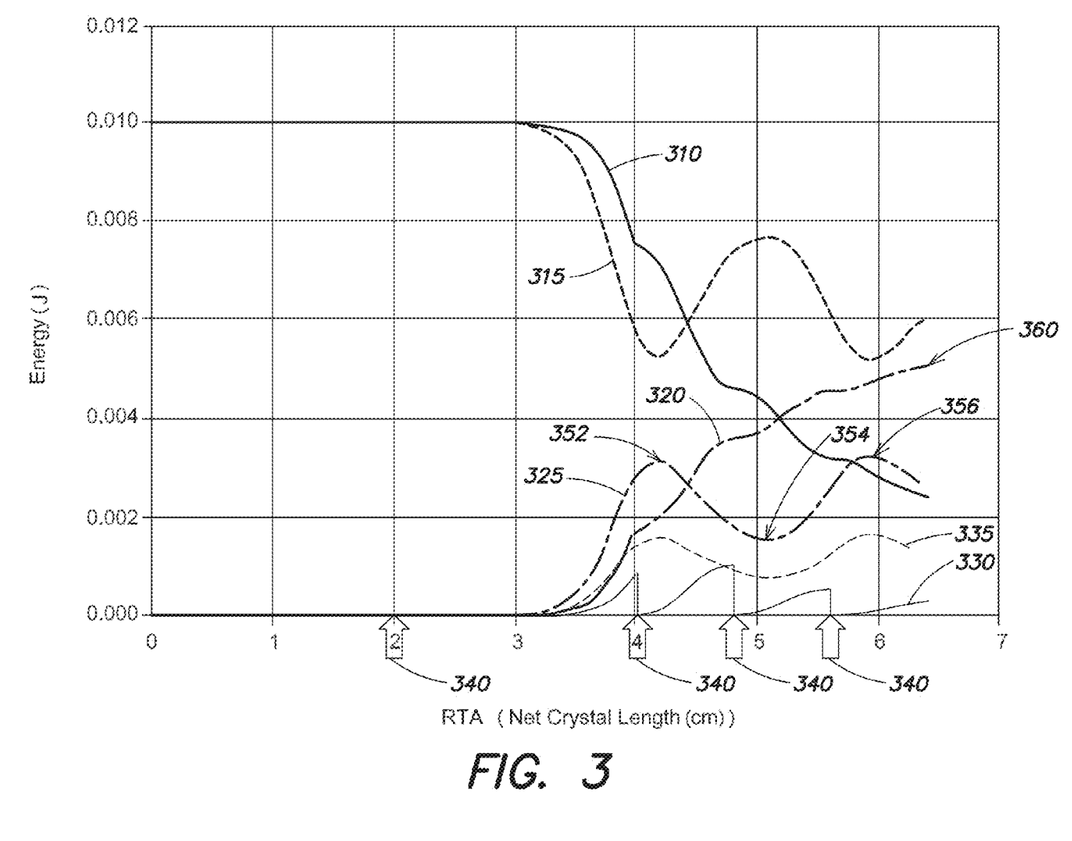
FIG. 3 is a graph illustrating simulated effects of periodic idler extraction in an example of an optical parametric amplifier according to aspects of the invention.
Figure 4:
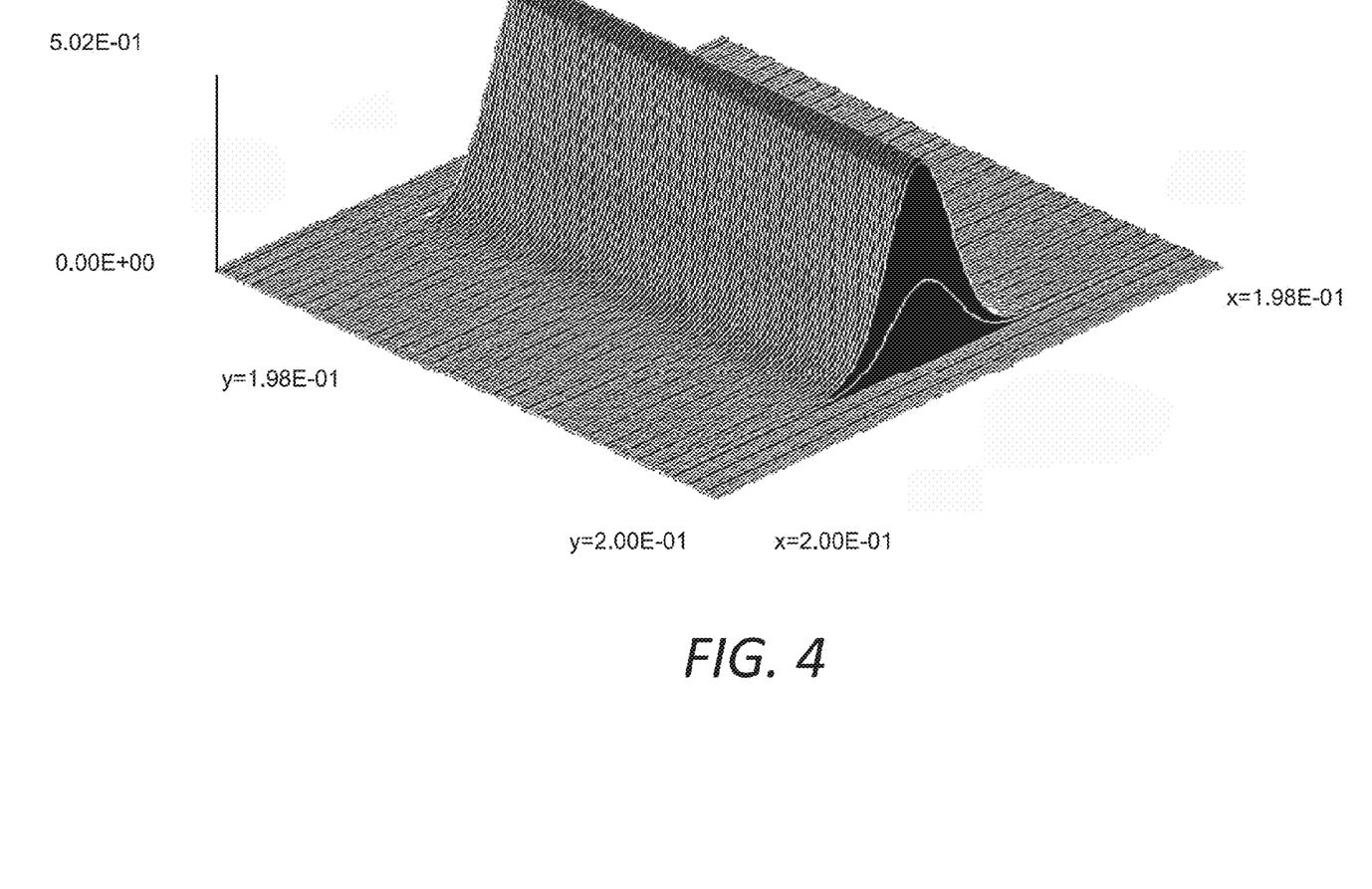
FIG. 4 is an illustration of the input pump beam profile used in the simulations that generated the graph of FIG. 3.

FIG. 3 is a graph illustrating an example of periodic idler extraction from the OPA system 200 simulated using General Laser Analysis and Design (GLAD) physical optics modeling software developed and maintained by Applied Optics Research of Woodland, Wash. For the simulation, the pump beam was modeled having a non-uniform spatial profile, specifically, a 1 mm by 3.2 mm Gaussian by top-hat spatial profile as illustrated in FIG. 4. The simulated pump beam had an incident peak fluence of 0.5 J/cm$^2$ and comprised a square temporal pulse with an energy of 10 mJ and a pulse duration of 0.8 ns. In FIG. 3, trace 310 represents the pump beam energy with idler extraction. For comparison, trace 315 represents the pump beam energy without idler extraction. Trace 320 represents the signal energy with idler extraction. For comparison, trace 325 represents the signal energy without idler extraction. The signal seed was simulated as an 80 mW continuous wave (CW) signal with a 3 mm diameter Gaussian spatial profile. Trace 330 represents the idler energy with extraction. For comparison, trace 335 represents the idler energy without extraction. In the simulation, 99% of the idler was extracted at points 340. The simulation demonstrates that without idler extraction, the system has a maximum conversion efficiency of pump to signal of approximately 30%. At point 352, the signal (without idler extraction) has a conversion efficiency of approximately 32% and a Strehl ratio of 1. At point 354, the signal (without idler extraction) has a conversion efficiency of approximately 16% and a Strehl ratio of 0.67. At point 356, the signal (without idler extraction) has a conversion efficiency of approximately 33% and a Strehl ratio of 0.68. By contrast, with idler extraction, the conversion efficiency is significantly improved (about 50%) and the signal quality remains good. For example, at point 360, the signal (with idler extraction) has a conversion efficiency of 52% and a Strehl ratio of 0.98. These simulated results demonstrate that idler extraction is significantly beneficial for an OPA that uses a pump beam with a non-uniform spatial profile.

Figure 5:
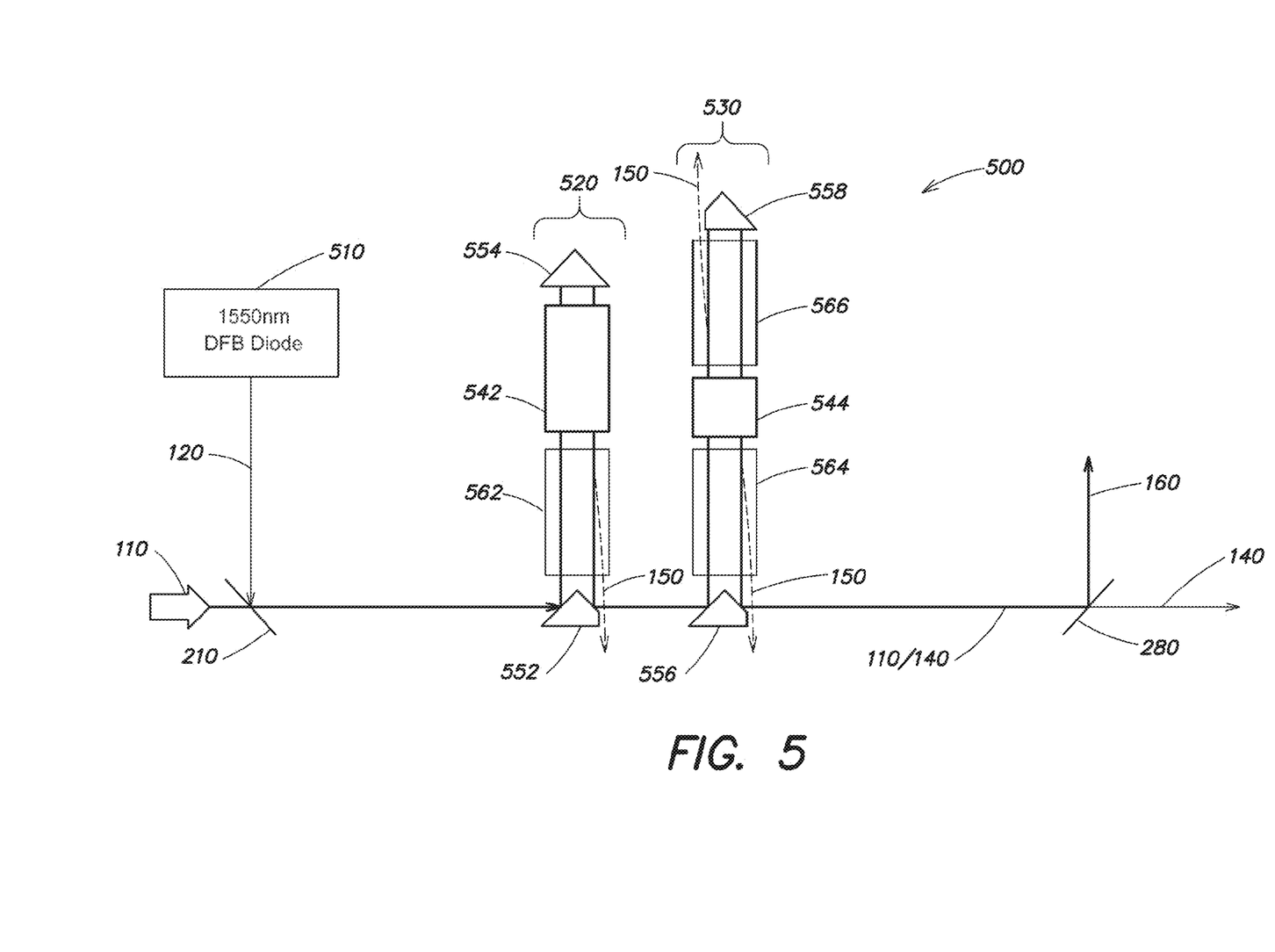
FIG. 5 is a block diagram of another example of a multi-stage optical parametric amplifier according to aspects of the invention.

In the example OPA system 200 illustrated in FIG. 2, the various gain stages are shown in a "single pass" configuration. However, in other embodiments, the system may be configured such that the pump and signal beams travel through any of the gain stages multiple times. This may allow for a more compact design and the use of fewer gain materials and/or beam displacer crystals. For example, referring to FIG. 5, there is illustrated a schematic block diagram of another example of a multi-stage OPA 500 in which the idler extraction methods according to aspects of the invention may be used. A laser source 510, such as a 1550 nm distributed feedback (DFB) laser diode, for example, may be used to generate the signal seed 120. The pump beam 110 and signal seed 120 may be combined and input to the gain stages of the multi-stage OPA using a dichroic beamsplitter 210. The multi-stage OPA 500 includes a first section 520 and a second section 530, similar to the multi-stage OPA 200 discussed above. In this example, a first prism 552 (or other reflecting device) directs the pump and signal beams via a first beam displacer crystal 562 to a first gain stage 542. A second prism 554 (or other reflecting device) reflects the pump and signal beams back through the first gain stage 542 and the first beam displacer crystal 562. Thus, in the first section 520, the two gain stages 242 and 244 of the example of FIG. 2 may be replaced by a single gain stage 542 because the pump and signal beams travel twice through the gain stage. In one example, the second prism 554 may be made of BK7 glass or another material that is absorptive at the wavelength of the idler 150, such that it may act as an absorbing medium and extract some or all of the idler 150 present after traversing that stage. The first beam displacer crystal 562 spatially displaces the idler 150 as the beams travel back through the crystal on the return path, as shown in FIG. 5. Accordingly, the idler 150 may be extracted upon exit from the first beam displacer crystal 562. For example, the first prism 552 may be an absorbing medium (e.g., BK7 glass or another material that is absorptive at the wavelength of the idler 150) that extracts the idler. Alternatively, the first prism 552 may be shaped so that the spatially-displaced idler beam is not turned by the reflective surface of prism 552, but instead is extracted or scraped from the OPA system 500. In one example, the first gain stage 542 is RTA, having a length of 20 mm (in the direction of travel of the pump and signal beams), a width of 10 mm, and a thickness of 5 mm. In one example, the first beam displacer crystal 562 is rutile, having the same dimensions as the first gain stage.

A third prism 556 (or other reflecting device) may direct the combined pump and signal beams via a second beam displacer crystal 564 to a second gain stage 544, as shown in FIG. 5. A third beam displacer crystal 566 follows the second gain stage, and displaces the idler 150 as discussed above. A fourth prism 558 (or other reflecting device) reflects the pump and signal beams back through the third beam displacer crystal 566, the second gain stage 544, and the second beam displacer crystal 564, as shown. In one example, the third and fourth prisms 556 and 558 are BK7 glass and may extract some or all of the idler 150 present at the respective stages. Alternatively, the prisms 556 and 558 may be shaped so that the spatially-displaced idler is not turned by their respective reflective surfaces and is extracted or scraped from the OPA system 500. The second beam displacer crystal 564 spatially displaces the idler 150 as the beams travel back through the crystal on the return path, as also shown in FIG. 5. A dichroic beamsplitter 280 is used to separate the depleted pump 160 from the amplified output signal 140 at the output of the OPA 500. One or more of the prisms 552, 556, and 558 may be alternatively configured to reflect (or turn) the idler along with the pump and signal beams, to allow for idler extraction at a later point in the chain.

Figure 6:
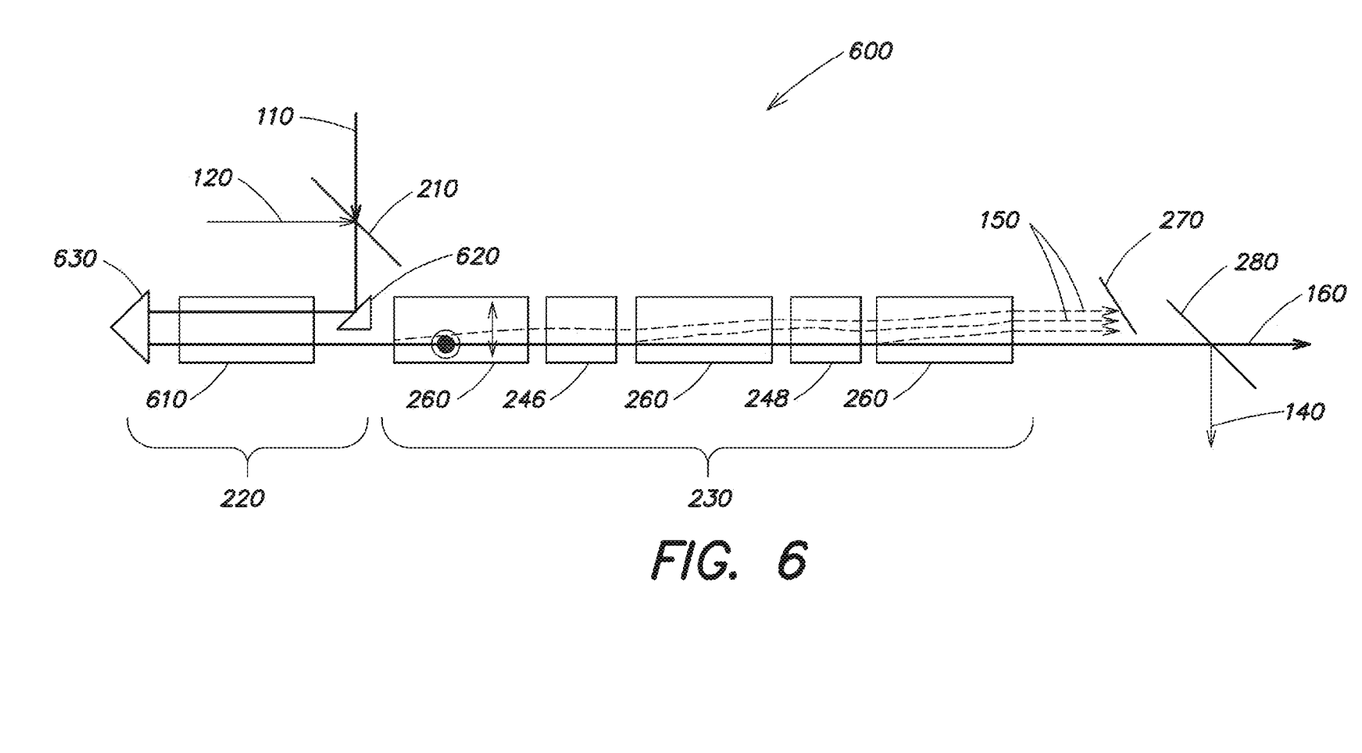
FIG. 6 is a block diagram of another example of a multi-stage optical parametric amplifier according to aspects of the invention.

Referring to FIG. 6, there is illustrated a block diagram of another embodiment of multi-stage OPA 600 in which the idler extraction methods according to aspects of the invention may be used. In this example, the OPA comprises the first section 220, which includes a gain stage 610 in a double pass configuration, followed by the second section 230 including the gain stages 246, 248 as discussed above. The gain stage 610 may include one RTA crystal, through which the pump beam 110 and signal seed 120 make two passes, as shown. In the illustrated example, the pump input 110 and signal seed 120 are input to the first gain stage via a dichroic beamsplitter 210. A turning mirror 620 may be used to redirect the pump beam 110 and signal seed 120 into the gain stage 610. The turning mirror 620 may be 100% reflective at the wavelengths of the pump beam 110 and signal seed 120. A prism 630 (or other reflecting device) reflects the pump and signal beams back through the first gain stage 610 for the second pass. Thus, in this embodiment, the two gain stages 242 and 244 of the example of FIG. 2 may be replaced by the single gain stage 610 because the pump and signal beams travel twice through the gain stage. In one example, the prism 630 may be made of BK7 glass or another material that is absorptive at the wavelength of the idler 150, such that it may act as an absorbing medium and extract some or all of the idler 150 after traversing that stage. The beams then traverse the second section 230 of the OPA 600, which includes multiple gain stages 246, 248 and beam displacer crystals 260. As discussed above with reference to FIG. 2, the beam displacer crystals 260 cause separation between the idler 150 and the pump and signal beams 110, 120. After the last beam displacer crystal 260 in the chain, the idler 150 may be removed spatially from the OPA system 600 using a scraper mirror 270, as discussed above. A dichroic beamsplitter 280 is used to separate the depleted pump 160 from the amplified output signal 140.

Figure 7:
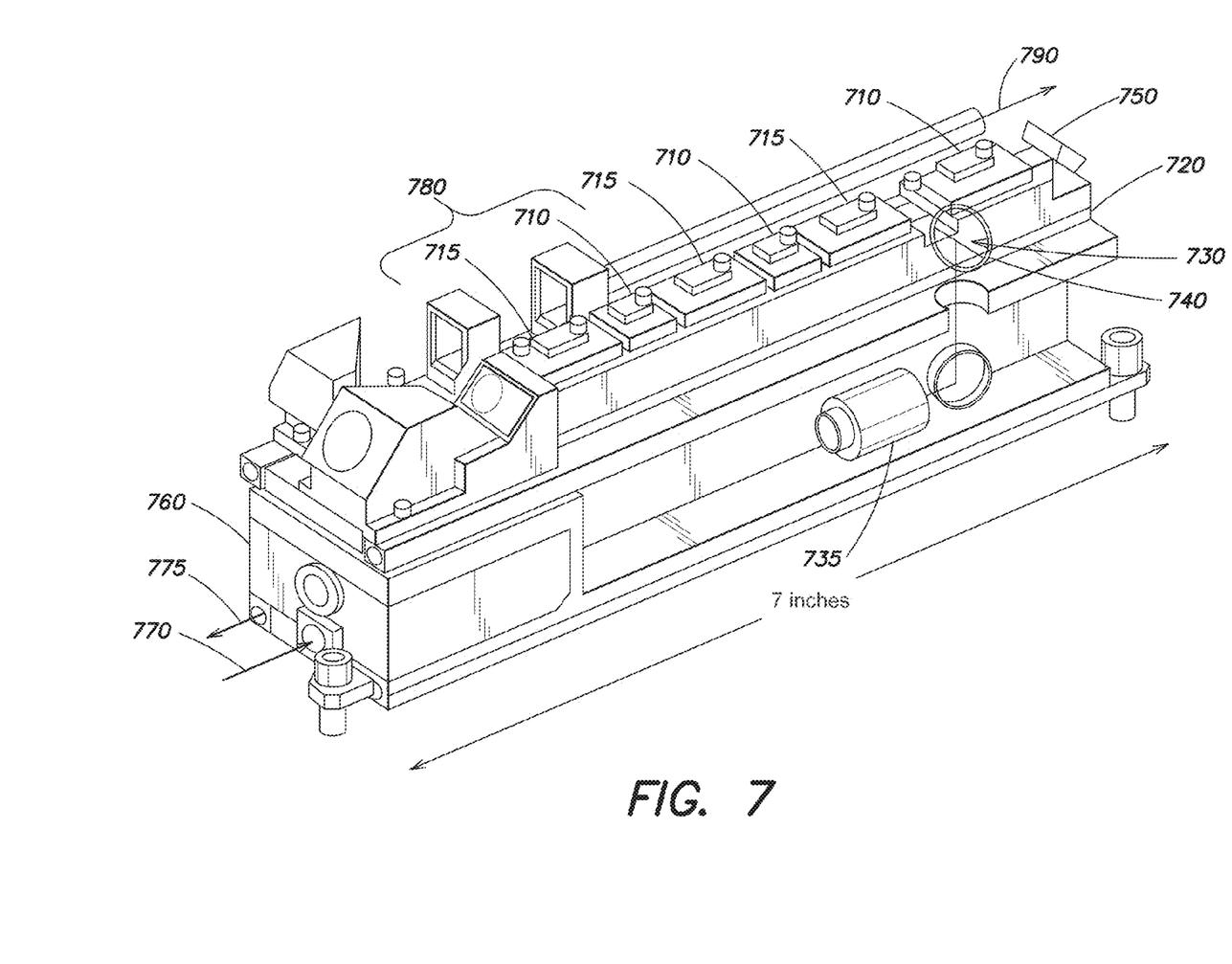
FIG. 7 is a diagram of one example of a configuration of a packaged optical parametric amplifier according to aspects of the invention.

FIG. 7 illustrates one example of a packaged OPA system 700 according to one embodiment. In this example, the OPA includes three gain stages 710, for example, RTA crystals, as discussed above, interspersed with three beam displacer crystals 715. The beam displacer crystals 715 may be rutile, as also discussed above. The gain stages 710 and beam displacer crystals are disposed on a ceramic insulator 720. In one example of the OPA system 700, a 1030 nm pump beam is used, and is input to the system at input 730. A fiber coupled telecom laser diode may be coupled to a fiber collimator 735 and used to produce the signal seed. In one example, the signal seed is a 1550 nm signal. A dichroic beamsplitter 740 is used to combine and direct the pump beam and signal seed to the gain stages of the OPA, as discussed above. The implementation illustrated in FIG. 7 corresponds to an implementation of the configuration schematically illustrated in FIG. 6. Accordingly, a BK7 glass prism 750 reflects the pump and signal beams back through the first gain stage to the remaining gain stages and beam displacer crystals, as discussed above. The extracted idler is directed to a copper "beam dump" 760. The beam dump 760 is cooled using a liquid coolant that is input at 770, circulated through the beam dump, and output at 775. After the idler is extracted, the amplified beam is passed through beam shaping optics 780, and exits the OPA 700 at a system output 790. The beam shaping optics may be configured particularly for the wavelength of the amplified signal, for example, 1550 nm. In one example, the length of the packaged OPA system 700 may be approximately 7 inches. Thus, an OPA system configured to implement the idler extraction methods discussed above may be implemented in a compact package including a single cooling system.

Aspects and embodiments provide a multi-stage OPA system in which the idler is translated out of the signal/pump interaction region via walk-off beam displacers. In particular, the walk-off beam displacers may be made of crystalline $TiO_2$ (rutile), $TeO_2$, or $YVO_4$ (vanadate). In certain embodiments, RTA crystal(s) are used for parametric down-conversion from 1030 nm to 1550 nm, as discussed above. The combination of RTA gain stages and beam displacer crystals in an OPA is configured to displace one wave (signal or idler) between OPA gain stages and thus preventing it from interacting with the other two waves in a subsequent OPA gain stage. This may be particularly useful in high-power OPAs since the displaced wave can be directed to a heat sink from a single location following all OPA stages. Furthermore, this configuration may advantageously eliminate the need for multi-layer-coated dichroic or polarizing mirrors with reflectivity specifications at all three wavelengths. Additionally, aspects and embodiments provide for the use of different lengths of gain stages in a multi-stage OPA to reset the local rates of conversion across the pump beam aperture. In particular, the path lengths of the OPA gain stages may be selected to avoid back-conversion in local transverse regions when using a pump beam with a non-uniform spatial profile (e.g. Gaussian or Gaussian by top-hat). In particular, shorter-path OPA crystals may be used in the latter stages of the system, as discussed above. This approach avoids local back-conversion in a non-uniform beam profile and allows good conversion efficiency across the entire beam with good beam quality Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-stage optical parametric amplifier comprising:
an amplifier chain including a plurality of gain stages, each gain stage including a non-linear optical crystal, the plurality of gain stages configured to receive a signal seed and a pump beam and to produce an idler beam and an amplified signal, the pump beam having a non-uniform spatial profile; and
a plurality of idler extractors including at least one walk-off beam displacer crystal, the plurality of idler extractors configured to substantially preclude the idler beam from further interaction with the amplified signal and the pump beam, the plurality of idler extractors being located prior to those points within the amplifier chain where at least a portion of the pump beam spatial profile would become depleted in the absence of each idler extractor.

2. The multi-stage optical parametric amplifier of claim 1, wherein the plurality of idler extractors includes a plurality of dichroic mirrors, or absorbers, or both.

3. The multi-stage optical parametric amplifier of claim 1, wherein the signal seed, the amplified signal, and the pump beam share a first linear polarization state, and the idler beam has a second, orthogonal linear polarization state; and
wherein the plurality of idler extractors further includes a plurality of polarizers.

4. The multi-stage optical parametric amplifier of claim 3, wherein phase-matching of the non-linear optical crystal is birefringence phase matching of Type II or quasi-phase-matching of Type II.

5. The multi-stage optical parametric amplifier of claim 3, wherein
the plurality of idler extractors is interspersed with the plurality of gain stages and is configured to produce a spatial separation of the idler beam from the amplified signal and the pump beam, wherein upon exit from each of the plurality of idler extractors the amplified signal and the pump beam are collinear and the idler beam is spatially offset from the amplified signal and the pump beam.

6. The optical parametric amplifier of claim 5, wherein the non-linear optical crystal is rubidium titanyl arsenate (RTA), and wherein the at least one walk-off beam displacer crystal is made of crystalline $TiO_2$ (rutile), $TeO_2$, or $YVO_4$.

7. The optical parametric amplifier of claim 1, wherein the plurality of gain stages includes a first gain stage, a second gain stage, a third gain stage, and a fourth gain stage; and
wherein the plurality of idler extractors includes:
a first idler extractor positioned between the first and second gain stages;
a second idler extractor positioned between the second and third gain stages; and
a third idler extractor positioned between the third and fourth gain stages.

8. The optical parametric amplifier of claim 7, wherein the first idler extractor is an absorbing medium.

9. The optical parametric amplifier of claim 8, wherein the absorbing medium is BK7 glass.

10. The optical parametric amplifier of claim 7, wherein the first and second gain stages have longer length than the third and fourth gain stages.

11. The optical parametric amplifier of claim 5, wherein the at least one walk-off beam displacer crystal is oriented such that the pump beam and amplified signal are ordinary waves and the idler beam is an extraordinary wave.

12. The optical parametric amplifier of claim 5, further comprising a mirror positioned after the last one of the plurality of idler extractors in an optical path of the idler beam and configured to direct the idler beam to an idler dumping point of the optical parametric amplifier.

13. The optical parametric amplifier of claim 1, wherein the non-uniform spatial profile of the pump beam is Gaussian.

14. The optical parametric amplifier of claim 1, wherein the non-uniform spatial profile of the pump beam is top-hat in one transverse axis and Gaussian in an orthogonal transverse axis.

15. The optical parametric amplifier of claim 1, wherein a wavelength of the pump beam is 1030 nanometers, and a wavelength of the amplified signal is 1550 nanometers.

16. A multi-stage optical parametric amplifier comprising:
an amplifier chain including a plurality of gain stages, each gain stage including a nonlinear optical crystal, the plurality of gain stages configured to receive a signal seed and a pump beam and to produce an idler beam and amplified signal; and
a plurality of idler extractors including at least one walk-off beam displacer crystal, the plurality of idler extractors interspersed with the plurality of gain stages and configured to spatially offset the idler beam from the amplified signal and the pump beam, and to maintain the idler beam substantially parallel to the pump beam and the amplified signal.

17. The multi-stage optical parametric amplifier of claim 16, wherein
the signal seed, the amplified signal, and the pump beam share a first linear polarization state, and the idler beam has a second, orthogonal linear polarization state.

18. The multi-stage optical parametric amplifier of claim 17, wherein phase-matching of the non-linear optical crystal is birefringence phase matching of Type II or quasi-phase-matching of Type II.

19. The optical parametric amplifier of claim 18, wherein the non-linear optical crystal is rubidium titanyl arsenate (RTA), and wherein the at least one walk-off beam displacer crystal is made of crystalline $TiO_2$ (rutile), $TeO_2$, or $YVO_4$.

20. The optical parametric amplifier of claim 16, further comprising a mirror positioned after the last one of the plurality of idler extractors in an optical path of the idler beam, and configured to direct the idler beam to an idler dumping point of the optical parametric amplifier.

21. A method of idler extraction in an optical parametric amplifier, the method comprising:
receiving a signal seed and a pump beam at an input to an amplifier chain, the amplifier chain including a plurality of gain stages, each gain stage including a non-linear optical crystal, and the pump beam having a non-uniform spatial profile;
amplifying the signal seed with the plurality of gain stages to produce an idler beam and an amplified signal; and
spatially offsetting the idler beam from the amplified signal and the pump beam using a plurality of walk-off beam displacer crystals positioned within the amplifier chain, such that the idler beam propagates through the amplifier chain substantially parallel to the pump beam and the amplified signal.

22. The method of claim 21, wherein the signal seed, the amplified signal, and the pump beam share a first linear polarization state, and the idler beam has a second, orthogonal linear polarization state.

23. The method of claim 21, further comprising directing the idler beam to an idler extraction point located after a last one of the plurality of walk-off beam displacer crystals within the amplifier chain.

\* \* \* \* \*